US008707051B2

(12) United States Patent
Osugi et al.

(10) Patent No.: US 8,707,051 B2
(45) Date of Patent: Apr. 22, 2014

(54) METHOD AND SYSTEM FOR EMBEDDED HIGH PERFORMANCE RECONFIGURABLE FIRMWARE CIPHER

(75) Inventors: Kevin Joel Osugi, Gilbert, AZ (US); Nhu-Ha Yup, Phoenix, AZ (US); Michael D. Collins, Crofton, MD (US); Lee Paul Noehring, Peoria, AZ (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 13/487,296

(22) Filed: Jun. 4, 2012

(65) Prior Publication Data

US 2012/0311348 A1  Dec. 6, 2012

Related U.S. Application Data

(60) Provisional application No. 61/493,402, filed on Jun. 3, 2011.

(51) Int. Cl.
*G06F 11/30* (2006.01)

(52) U.S. Cl.
USPC ............. 713/189; 713/193; 713/194; 726/16; 726/18; 726/27

(58) Field of Classification Search
USPC ........... 713/189, 193–194, 179; 726/18, 16, 2
See application file for complete search history.

(56) References Cited

U.S. PATENT DOCUMENTS

| 4,275,265 | A | 6/1981 | Davida et al. |
| 7,309,017 | B2 * | 12/2007 | Zaba et al. .................... 235/487 |
| 7,623,656 | B2 * | 11/2009 | Hawkes et al. ................. 380/42 |
| 7,702,925 | B2 * | 4/2010 | Northcutt et al. ............. 713/193 |
| 7,860,248 | B2 * | 12/2010 | Ishiguro et al. ................. 380/44 |
| 7,925,891 | B2 | 4/2011 | Crispin et al. |
| 8,011,005 | B2 * | 8/2011 | Cruzado et al. .................. 726/16 |
| 8,037,518 | B2 * | 10/2011 | Buer ............................... 726/11 |
| 8,170,206 | B2 * | 5/2012 | Ishiguro et al. ................. 380/44 |
| 8,346,742 | B1 * | 1/2013 | Juels et al. ..................... 707/698 |
| 8,379,841 | B2 * | 2/2013 | Taylor et al. .................... 380/28 |
| 2002/0191790 | A1 * | 12/2002 | Anand et al. .................. 380/255 |
| 2006/0265689 | A1 * | 11/2006 | Kuznetsov et al. ........... 717/117 |
| 2007/0220279 | A1 * | 9/2007 | Northcutt et al. ............. 713/193 |
| 2008/0013723 | A1 * | 1/2008 | Ishiguro et al. ................. 380/45 |
| 2010/0161959 | A1 * | 6/2010 | Sood ............................. 713/151 |
| 2012/0102334 | A1 * | 4/2012 | O'Loughlin et al. ......... 713/189 |

OTHER PUBLICATIONS

Niemann, Evaluation of the Scalable GigaNetIC Architecture, Jul. 2005, GigaNetIC and Infineon Technologies, pp. 1-8.*

(Continued)

*Primary Examiner* — Cordelia Zecher
*Assistant Examiner* — Viral Lakhia
(74) *Attorney, Agent, or Firm* — Davidson Berquist Jackson & Gowdey, LLP

(57) ABSTRACT

A firmware cipher component is provided which can be configured and programmed to efficiently implement a broad range of cryptographic ciphers while accelerating their processing. This firmware cipher component allows an ASIC to support multiple cipher algorithms while accelerating the operations beyond speeds conventionally achieved by software or firmware only solutions. This system combines cryptographic specific custom instructions with hardware based data manipulation accelerators. The cryptographic specific custom instructions and hardware accelerators may support both block and stream ciphers. Thus, the system may be reconfigured, allowing the cipher algorithm to change without halting the system. Further, embedding the Firmware Programmable Cipher within an ASIC may allow future capabilities to be supported in secure applications.

10 Claims, 3 Drawing Sheets

(56) References Cited

OTHER PUBLICATIONS

Tell E, Low Area and Low Power Programmable based architecture, Jul. 2005, IEEE, vol. 5, pp. 347-351.*
International Search Report and Written Opinion mailed Aug. 17, 2012 in PCT/US2012/040678.
Niemann et al. "An Evaluation of the Scalable GigaNetIC Architecture for Access Networks." In: [online]. Dated 2005. Retrieved on Jul. 26, 2012. Retrieved from the Internet at URL:<https://pub.unibielefeld.de/luur/download?func=downloadFile&recordOld=2288853&fileOld=2407100>.
PCTUS2012040678 International Preliminary Report on Patentability of Dec. 4, 2013.

* cited by examiner

METHOD AND SYSTEM FOR EMBEDDED HIGH PERFORMANCE RECONFIGURABLE FIRMWARE CIPHER

RELATED APPLICATION

Benefit is claimed from U.S. Provisional Patent Application Ser. No. 61/493,402 filed Jun. 3, 2011, entitled "Method and System for Embedded High Performance Reconfigurable Firmware Cipher" which is incorporated by reference herein. This application is related to U.S. patent application Ser. No. 13/487,312 filed on Jun. 4, 2012, entitled "Method and System for a Programmable Parallel Computation and Data Manipulation Accelerator," which is also incorporated by reference herein.

FIELD OF THE INVENTION

This generally relates to cryptography and more particularly to devices used in performing cryptographic algorithms.

BACKGROUND

The rapid growth in Internet usage has increased the dependency on information stored and communicated by businesses and individuals. In particular, growth in DSL and cable modem usage by consumers and businesses and increased business-to-business Internet activity have contributed to this dependency. As the desire for confidentiality, authenticity, and integrity increases, an increasing proportion of this information is sent in secure or encrypted form. Further, an increasing proportion of electronic communication will occur at increasingly fast speeds as information technology ("IT") continues to develop.

Secure communications are desirable for sensitive activities, for example on-line financial transactions or the transmission of personal medical information. However, secure communications may require significantly increased processing demands at both the sending and receiving ends of a communications session. This processing demand is further increased as communication bandwidth improves and increases the volume of data for security processing. As the demand for secure Internet communication increases, security processing needs consume ever increasing proportions of the available central processing capability of communications network servers.

In secure Internet communication, for example, Internet Protocol ("IP") communication servers encrypt, decrypt, sign and authenticate inbound and outbound data packets to accomplish typical IP communication. Cryptographic processors and other devices accomplish or share some of the cryptographic processing load such as the encrypting, decrypting and authenticating of data packets.

The last decade has seen a push toward systems which support and/or utilize multiple cryptographic algorithms, or "ciphers." However, conventional systems may be unable to meet the processing speed demands of modern ciphers. For example, conventional devices may be a firmware system whereby a conventional microprocessor is programmed to perform the cipher. However, such conventional firmware systems require writing and testing of a large amount of code as well as requiring potentially long processing times, especially when performing complex ciphers or complex steps within a cipher.

Moreover, conventional systems may also be hardware devices designed and programmed to support those ciphers which are known and/or foreseen at the time the device is designed. Conventional encryption comprises a variety of different cipher families and many different ciphers within these families, and new ciphers are often created. When a new cipher is released after development of a conventional, hardware cryptographic device, the conventional device cannot be updated quickly and/or simply to support the new cipher.

Accordingly, there is a desire for a device which overcomes these and other related problems.

SUMMARY

A configurable data processing system is provided for executing a cryptographic protocol, comprising an input configured to receive data to be processed according to a cryptographic calculation. The data processing system further comprises a configurable processor configured to execute the cryptographic calculation on the input data based on the cryptographic protocol, comprising custom instructions configured to cause the processor to execute the cryptographic calculation. The data processing system also comprises one or more configurable hardware cipher data accelerators connected to the configurable processor and configured to process portions of input data to be processed.

In accordance with an embodiment, a method data processing system for executing a cryptographic protocol comprising configuring one or more configurable hardware cipher data accelerators connected to a configurable processor to process portions of data to be processed according to a cryptographic calculation based on the cryptographic protocol. The method further comprises inputting the data to be processed according to the cryptographic calculation to an ingress buffer, and executing, by the configurable processor, the cryptographic calculation on the input data based on custom instructions that cause the configurable processor to execute the cryptographic calculation. The method also comprises activating one or more of the configurable hardware cipher data accelerators to process portions of the input data.

DETAILED DESCRIPTION

Methods and systems in accordance with the present invention provide a firmware cipher component which can be configured and programmed to efficiently implement a broad range of cryptographic ciphers while accelerating their processing. This firmware cipher component allows an ASIC to support multiple cipher algorithms while accelerating the operations beyond speeds conventionally achieved by software or firmware only solutions. This system combines cryptographic specific custom instructions with hardware based data manipulation accelerators. The cryptographic specific custom instructions and hardware accelerators may support both block and stream ciphers. Thus, the system may be reconfigured, allowing the cipher algorithm to change without halting the system. Further, embedding the Firmware Programmable Cipher within an ASIC may allow future capabilities to be supported in secure applications.

In one implementation, the system may be a processor within an application specific integrated circuit ("ASIC"). In some implementations, this processor may be coupled to hardware accelerators available to the processor, allowing faster performance of the mathematical transformations and other steps within a cipher. In some implementations, custom instructions may be programmed into the processor's firmware functionality, providing flexibility as further increasing performance and/or processing speed.

The firmware cipher component may process incoming ingress data with a processor that may be programmed with custom instructions configured on the processor. It may also have a memory having additional instructions for processing the data. These sets of instructions may be configured to process data according to a particular algorithm. They may be reprogrammed to handle different types of algorithms. The firmware cipher component may also have one or more additional configurable hardware accelerators. The processor may output specific tasks to any of these accelerators suited to handle the task. For example, an encryption algorithm may include many sub-tasks and problems that may be outputted from the processor to the appropriate accelerators which may return the result back to the processor. This improves speed and performance of the system while freeing the processor for other calculations and therefore reducing time to process the ingress data. In this example, four configurable hardware accelerators are shown. They may be configured through the configuration control for example. Different sub-tasks may be provided to each accelerator based on the functions of that accelerator. Therefore the accelerators and the processor process the cryptographic data efficiently and rapidly, while providing the flexibility to be configured to different algorithms.

Figure 1:
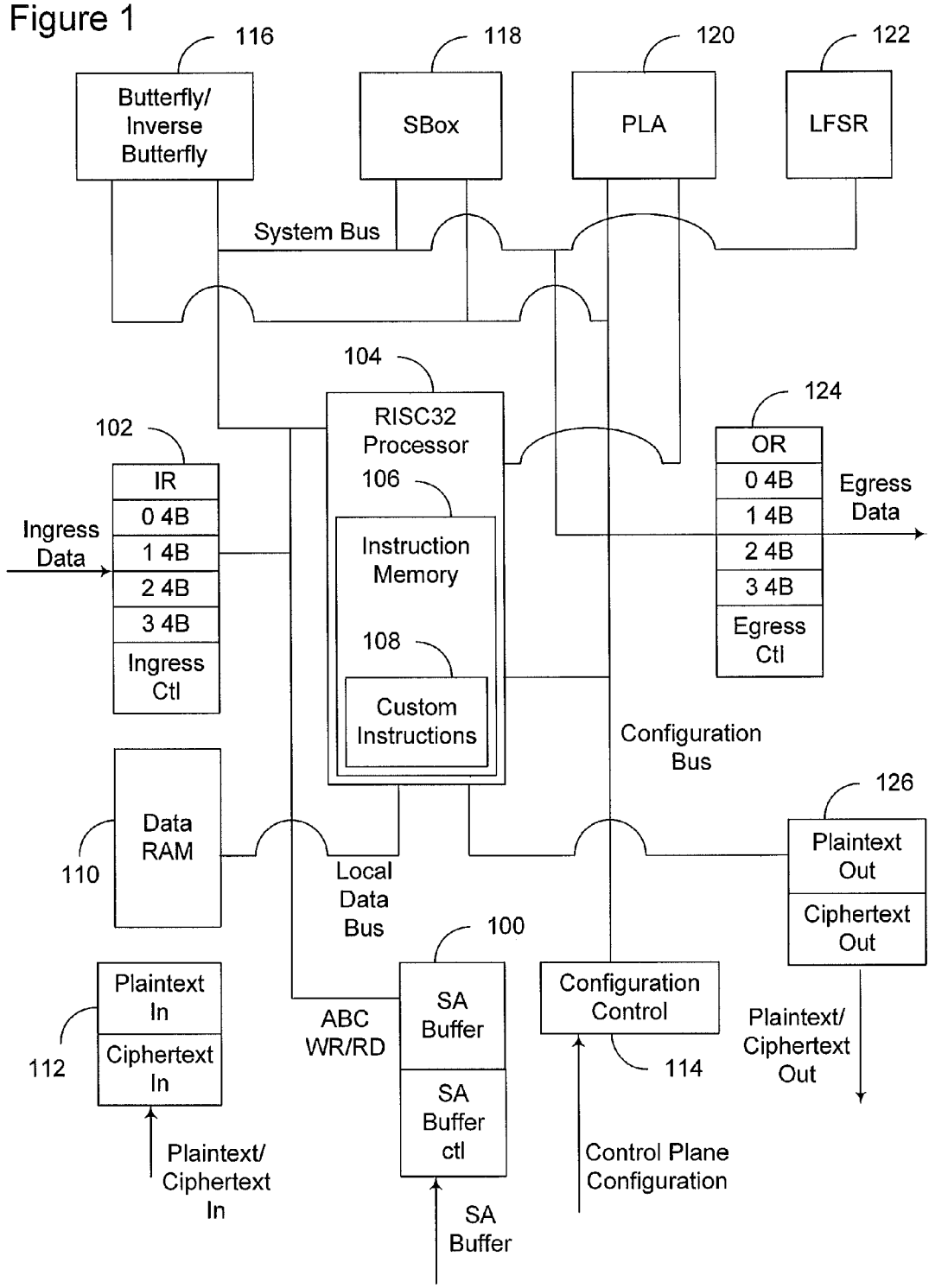
FIG. 1 illustrates an exemplary embodiment of a firmware cipher component made in accordance with methods and systems consistent with the present invention.

FIG. 1 illustrates an exemplary embodiment of a firmware cipher component made in accordance with methods and systems consistent with the present invention. A security association ("SA") may be created for each file or data flow and may be required to be retrieved before the data encryption or decryption can begin. SA Buffer 100 comprises an SA Buffer and SA Buffer Controller. SA Buffer 100 may automatically fetch the encrypt or decrypt key for the data to be encrypted or decrypted by the system at an early opportunity, bringing that key into the system and holding it ready for use when the appropriate packet data enters the system. In some implementations, the SA may be retrieved from another part of the system where it is typically in encrypted form, and be decrypted before storage in SA Buffer 100. SA Buffer 100 may be programmed with pre-fetch instructions for multiple data packets to be processed so that keys will be in the system when the corresponding data arrives, speeding processing time. SA Buffer 100 may also fetch and store other appropriate cryptographic variables, for example initialization vectors or counter values. Once SA Buffer 100 is used for a packet or frame, it may be cleared and thus made available for another SA.

A firmware cipher component consistent with methods and systems in accordance with the present invention may be part of a data path within a networking system. Ingress data, the data to be transformed via encryption or decryption, enters the system as packets or frames with headers identifying the data type and transformations to be accomplished via IR 102, the system's primary ingress buffer. Alternatively, the system may comprise an alternative ingress port, for example Plaintext In/Ciphertext In 112. Once the data enters ingress register IR 102, Processor 104, the primary system processor which may be a RISC processor, performs given operations on the data based on instructions it receives from the Ingress Controller, a component of IR 102. Processor 104 comprises Instruction Memory 106, whereby it may be programmed with Custom Instructions 108, a software component consistent with the present invention. In other implementations, the system may utilize a Data RAM, for example Data RAM 110, exterior to the Processor 104 to store temporary variables, and additional instructions to implement the cryptographic algorithm.

Configuration Control 114 controls a separate configuration bus which allows the control plane processor to place the code to be executed and the configuration of the various accelerators, for example Butterfly/Inverse Butterfly 116, SBox 118, PLA 120, and LFSR 122, before the processor is released from reset. Thus, this separate port allows the configuration and code to be loaded onto the system before data ingresses to the Processor 104 so the firmware cipher component is ready to operate once the appropriate amount of data ingresses. Further, in some implementations, the system is able to dynamically shift algorithms. Thus, if the system is running a particular cipher and the system performs a dynamic shift, the user is able to reset the control plane processor and reconfigure it for the new cipher.

Once the appropriate number of bytes of data to be transformed as corresponds to the algorithm to be performed, for example 16 bytes in the AES algorithm, ingresses to Processor 104, the firmware cipher component begins processing the data through the steps of the programmed algorithm.

Instructions for processing through the programmed algorithm may be Custom Instructions 108. Custom instructions 108 may be hardwired in Processor 104 as separate operation codes ("opcodes"), and in such implementations, the compiler of Processor 104 would recognize them as separate from software instructions in memory. Individual custom instructions of Custom Instructions 108 may work on a different part of the cipher, for example key expansion or state updates, to help the system progress through the cipher's logical process. Beyond executing given ciphers more simply, Custom Instructions 108 may accelerate the algorithm by allowing the system to update multiple data registers with one instruction.

The data registers affected by Custom Instructions 108 are registers native to Processor 104. In some implementations, Processor 104 has an extended register set—processor registers in extended register space. Processor 104 may naturally access these registers and the logic around them, allowing the system to implement the algorithm wherever these registers are in Processor 104.

The firmware cipher component further comprises data manipulation accelerators, for example Butterfly/Inverse Butterfly 116, substitution box ("SBox") 118, Programmable Logic Array ("PLA") 120, and Linear Feedback Shift Register ("LFSR") 122. In some implementations, the firmware cipher component may utilize these accelerators to analyze cryptographic algorithms or steps therein, for example bit manipulations or logical combinations, in one clock cycle or less, accelerating the overall processing time of the algorithms. For example, Butterfly/Inverse Butterfly 116 may perform a bit-transposition, for example a matrix transpose.

Butterfly/Inverse Butterfly 116 comprises a Butterfly and Inverse Butterfly Permuter and a Lookup Table. This accelerator may individually utilize or cascade its permuter and lookup table components. Processor 104 writes the input data as d-words through the system bus connection. Optimizations provide a means to write data to multiple input data registers of the permuter of Butterfly/Inverse Butterfly 116, reducing latency of the operation. The permute operation may be completed in a single clock cycle and then the output registers of Butterfly/Inverse Butterfly 116 are logically mapped to multiple d-word registers, which may be read by Processor 104 as permuted data. In other implementations, the permuter output may become lookup table input within Butterfly/Inverse Butterfly 116, the lookup table allowing complex logical functions to be completed through mapping of the registered permuter output data through the lookup feature. The logic functionality of the lookup and the data used for the lookup may be independently configured in the same manner as the permuter configuration. Further, the input to the lookup logic may be directly written by Processor 104, as supported by a 2-to-1 multiplexing feature between the permuter output and the lookup input. The lookup and subsequent storage of the output data in output registers also may occur in one clock cycle or less. Processor 104 then reads the lookup output registers as multiple d-words. In some implementations the input and output registers may be external registers on the system bus. In other implementations the firmware cipher component may use available general purpose registers within Processor 104. In some implementations, the system may implement and/or utilize more than one Butterfly/Inverse Butterfly 116.

SBox 118 is another accelerator which may be implemented in exemplary embodiments of the present invention. In some implementations, the firmware cipher component may comprise multiple copies of SBox 118. Block ciphers often implement non-linear transformations as part of the cipher algorithm. The SBox 118 may be either a 1-to-1 transformation or a reduction transformation which may have an inverse function, the transformation usable in encryption and the reverse transformation usable in decryption. In some implementations, the system may have multiple individual memories, for example 8, allowing for a larger transformation, for example an 8 bit-to-8 bit transformation for each memory. These memories may be loaded by Processor 104 or by the control plane processor of Configuration Control 114. The memories may contain different values to support a cipher, or one set of data for encrypt SBox 118 and a different set of data for decrypt SBox 118. Processor 104 may write data to the input side of the memory as the index, and then read the result of the transformation from the memory at the next clock cycle. For example, this may be implemented as write/read registers on a system bus, or as Custom Instructions 108 within Processor 104, utilizing existing processor registers from the input and output data and a custom instruction opcode to initiate the data transformation. In some ciphers, a traditional SBox function is not required. Then, these memories may be used to implement a faster combinatorial logic function. The substitute box 118 may be a substitute box as known in the art.

PLA 120 is another accelerator which may be implemented in exemplary embodiments of the present invention. PLA 120 is an implementation of a standard Programmable Logic Array that provides solutions to a Boolean expression. The function is programmed into a memory as part of the system configuration, either by the Processor 104 or by the control plane processor of Configuration Control 114. Boolean logic expressions may be minimized into a logic equation of "and" then "or" terms, with inversions where required. Once a logical expression has been converted to this form, the algorithm may be configured into the PLA memory. Processor 104 may then write one d-word to a memory mapped register on the system bus, followed by writing to a control register with the control information for how many "and" terms to sequence through and how many "or" terms to sequence through. A state machine then sequences through the algorithm by applying the data mask from the memory to the true and complemented version of each of the bits of the data d-word. As each mask is applied, the "and" result is registered and then the algorithm proceeds to the next "and" term. When the "and" terms have been computed, the state matching in like manner sequences through mask terms for the "or" function, combining the previously computed "and" results in true and complemented form as specified by the configuration. Each "or" term is registered in an output register, and when terms have been completed, a status bit notifies Processor 104. The result of the logical function acting on the input data is then available to be read by Processor 104. The input, output, and control register can optionally be tightly integrated within general purpose registers within Processor 104. In some implementations, the amount of Boolean functions which may be implemented may be enlarged by programmatically configuring the "and" array to be an exclusive "or" array. The PLA may be a PLA as known in the art.

LFSR 122 is another accelerator which may be implemented in exemplary embodiments consistent with the present invention. LFSR 122 shares some characteristics of conventional linear feedback shift registers. LFSR 122 may be used by the firmware for a block cipher to generate an initialization vector or the number used once ("NONCE"), a random or pseudo-random number issued in an authentication protocol to ensure that old communications cannot be reused in replay attacks. However, LFSR 122 is fully configurable in hardware to execute any polynomial which may be expressed within the LFSR tables, and the entire length of LFSR 122 advances in one clock.

In some implementations, there may be more than one instantiation of LFSR 122, for example, there may be 3 LFSRs. Each LFSR may be statically configured by Processor 104 or by the control plane processor of Configuration Control 114. Once each LFSR has been configured, Processor 104 may write the initial state for each LFSR as a standard "store" instruction for the local data bus, each "store" writing four bytes of initial state to the selected LFSR. In some implementations, a control register exists for each LFSR and causes the LFSR to sequence to the next state by a single write by Processor 104, or by a Custom Instruction 108. The current state of any bit or group of bits can be read back at any time for use in the cipher. Thus, LFSR 122 eliminates the loop of read, shift, exclusive "or", store sequence which Processor 104 would otherwise perform.

A maximum length polynomial will not repeat over the length of LFSR 122. Stream ciphers may also utilize acceleration for large LFSRs as part of the cipher. LFSR 122 may be any length, for example 256 bits. If LFSR 122 is shorter, it may be configured from the full length of logic by configuration of the tap and feedback terms. Two exemplary hardware implementations for LFSR 122 are Fibonacci and Galois, though one of ordinary skill in the art will realize that other implementations are possible. For example, a user may implement a Galois hardware implementation with logic to allow any flip flop in the shift register to be selected as the feedback term, and further to be exclusive "or" into the next state term for any other flip flop in order to implement a polynomial.

Once the firmware cipher component has finished processing the input cipher algorithm, egress data, the data left after transformation via encryption or decryption, exits the system as packets or frames with headers identifying the data type and transformations accomplished via OR 124, the system's primary egress buffer. Alternatively, the system may comprise an alternative egress port, for example Plaintext Out/Ciphertext Out 126.

Figure 2:
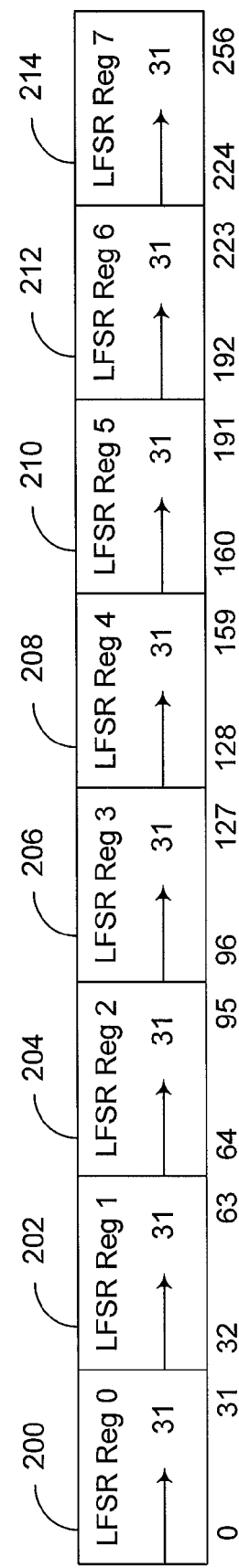
FIG. 2 depicts an exemplary embodiment of 32 bit registers of LFSR 122 in accordance with methods and systems consistent with the present invention.

FIG. 2 depicts an exemplary embodiment of 32 bit registers of LFSR 122 in accordance with methods and systems consistent with the present invention. It should be understood that the description of 8 registers and the description of 32 bit registers is given herein by way of example only. Persons having ordinary skill in the art will understand that any suitable number of registers, of any suitable size, may be used.

In the example of FIG. 2, eight 32 bit registers; LFSR Reg 0 200, LFSR Reg 1 202, LFSR Reg 2 204, LFSR Reg 3 206, LFSR Reg 4 208, LFSR Reg 5 210, LFSR Reg 6 212, and LFSR Reg 7 214; are implemented as d-word accessible from Processor 104. These registers are configured to be written to by Processor 104 store instructions to a memory mapped decode within the local system bus, and to be read by Processor 104 load instructions to the same memory mapped decode within the local system bus.

Figure 3:
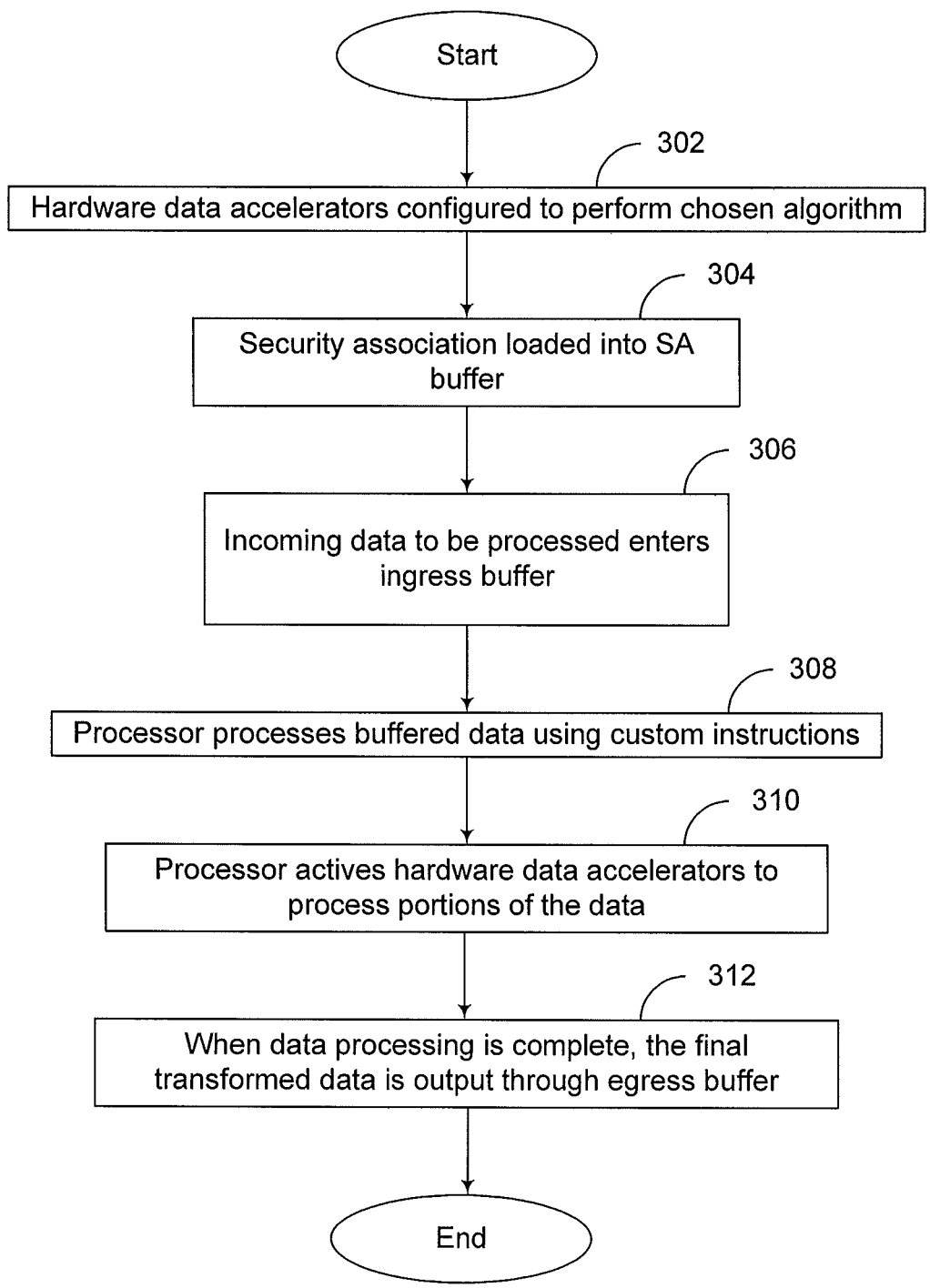
FIG. 3 illustrates a flowchart showing a method consistent with the present invention.

FIG. 3 illustrates a flowchart showing a method consistent with the present invention. First, the data manipulator accelerators (Butterfly/Inverse butterfly network 116, Sbox 118, PLA 120 and LFSR 122) are configured via the Configuration Control 114 to assist with processing portions of the cryptographic algorithm that may be accelerated by being calculated by the corresponding hardware accelerator (step 302). Then, the Security Association and cryptographic keys are loaded in the SA Buffer (step 304). The data to be manipulated is input into the input egress buffer and processed per the ingress controller (step 306). The Processor 104, using the custom instructions 108, processes the incoming data from the ingress buffer 102 to execute the cryptographic calculations according to the desired cryptographic algorithm (step 308). In doing so, the processor activates the different data manipulator accelerators as needed to process portions of the data to speed the calculations (step 310). When complete, the final transformed data is then output through the egress buffer 124 (step 312).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

The invention claimed is:

1. A configurable data processing system for executing a cryptographic protocol, comprising:
   an input configured to receive data to be processed according to a cryptographic calculation;
   a configurable processor configured to execute the cryptographic calculation on the input data based on the cryptographic protocol, comprising custom firmware instructions configured to cause the processor to execute the cryptographic calculation; and
   two or more configurable hardware cipher data accelerators connected to the configurable processor and configured to process portions of input data to be processed, wherein the two or more configurable hardware cipher accelerators further comprise two of: (1) a butterfly/inverse butterfly network, (2) a substitution box, (3) a programmable logic array, and (4) a linear feedback shift register.

2. The data processing system of claim 1, wherein the two or more configurable hardware cipher accelerators further comprise (1) a butterfly/inverse butterfly network, (2) a substitution box, (3) a programmable logic array, and (4) a linear feedback shift register.

3. The data processing system of claim 1, further comprising an output configured to buffer and output data resulting from executing the cryptographic calculation on the input data.

4. The data processing system of claim 1, further comprising a security association buffer configured to store a cryptographic key to be used during the cryptographic calculation.

5. The data processing system of claim 1, wherein in one or more of the one or more configurable hardware cipher data accelerators is a butterfly/inverse butterfly network which is connected to a look up table.

6. A method data processing system for executing a cryptographic protocol, comprising:
   configuring two or more configurable hardware cipher data accelerators connected to a configurable processor to process portions of data to be processed according to a cryptographic calculation based on the cryptographic protocol;
   inputting the data to be processed according to the cryptographic calculation to an ingress buffer;
   executing, by the configurable processor, the cryptographic calculation on the input data based on custom firmware instructions that cause the configurable processor to execute the cryptographic calculation; and
   activating one or more of the configurable hardware cipher data accelerators to process portions of the input data, wherein the two or more configurable hardware cipher accelerators further comprise two of: (1) a butterfly/inverse butterfly network, (2) a substitution box, (3) a programmable logic array, and (4) a linear feedback shift register.

7. The method of claim 6, wherein the two or more configurable hardware cipher accelerators further comprise (1) a butterfly/inverse butterfly network, (2) a substitution box, (3) a programmable logic array, and (4) a linear feedback shift register.

8. The method of claim 6, further comprising outputting data resulting from executing the cryptographic calculation on the input data.

9. The method of claim 6, further comprising storing a cryptographic key to be used during the cryptographic calculation in a security association buffer.

10. The method of claim 6, wherein one or more of the configurable hardware cipher data accelerators is a butterfly/inverse butterfly network which is connected to a look up table.

* * * * *